US012389142B2

(12) United States Patent
Colarusso et al.

(10) Patent No.: US 12,389,142 B2
(45) Date of Patent: Aug. 12, 2025

(54) DAISY CHAINING OF REMOTE OLTS

(71) Applicant: ARRIS Enterprises LLC, Suwanee, GA (US)

(72) Inventors: Theodore A. Colarusso, Madbury, NH (US); David Bowler, Stow, MA (US); Shawn W. Warner, Pepperell, MA (US); Bruce C. Pratt, Bedford, NH (US)

(73) Assignee: ARRIS Enterprises LLC, Suwanee, GA (US)

( * ) Notice: Subject to any disclaimer, the term of this patent is extended or adjusted under 35 U.S.C. 154(b) by 224 days.

(21) Appl. No.: 18/202,101

(22) Filed: May 25, 2023

(65) Prior Publication Data

US 2024/0056710 A1 Feb. 15, 2024

Related U.S. Application Data

(60) Provisional application No. 63/397,306, filed on Aug. 11, 2022.

(51) Int. Cl.
*H04Q 11/00* (2006.01)
*H04L 41/082* (2022.01)
*H04L 41/5003* (2022.01)

(52) U.S. Cl.
CPC ....... *H04Q 11/0067* (2013.01); *H04L 41/082* (2013.01); *H04L 41/5003* (2013.01); *H04Q 2011/0096* (2013.01)

(58) Field of Classification Search
CPC .................................................. H04Q 11/0067
See application file for complete search history.

(56) References Cited

U.S. PATENT DOCUMENTS

2004/0266452 A1* 12/2004 Kwon ................... H04B 1/7163
455/454
2008/0181171 A1* 7/2008 Koziy ................ H04W 88/085
370/328

FOREIGN PATENT DOCUMENTS

EP             3820085 A1     5/2021
JP             2021147360 A   8/2012

OTHER PUBLICATIONS

International Search Report and Written Opinion RE: Application No. PCT/US2023/023581, dated Sep. 25, 2023.

* cited by examiner

*Primary Examiner* — Shi K Li
(74) *Attorney, Agent, or Firm* — Chernoff, Vilhauer, McClung & Stenzel, LLP (57) ABSTRACT

A system supporting the daisy chaining of remote optical line terminals.

10 Claims, 6 Drawing Sheets

DAISY CHAINING OF REMOTE OLTS

CROSS REFERENCE TO RELATED APPLICATIONS

This application claims priority to U.S. Provisional Patent Application Ser. No. 63/397,306 filed Aug. 11, 2022.

BACKGROUND

The subject matter of this application relates to daisy chaining of remote OLTs for passive optical networking.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Figure 1:
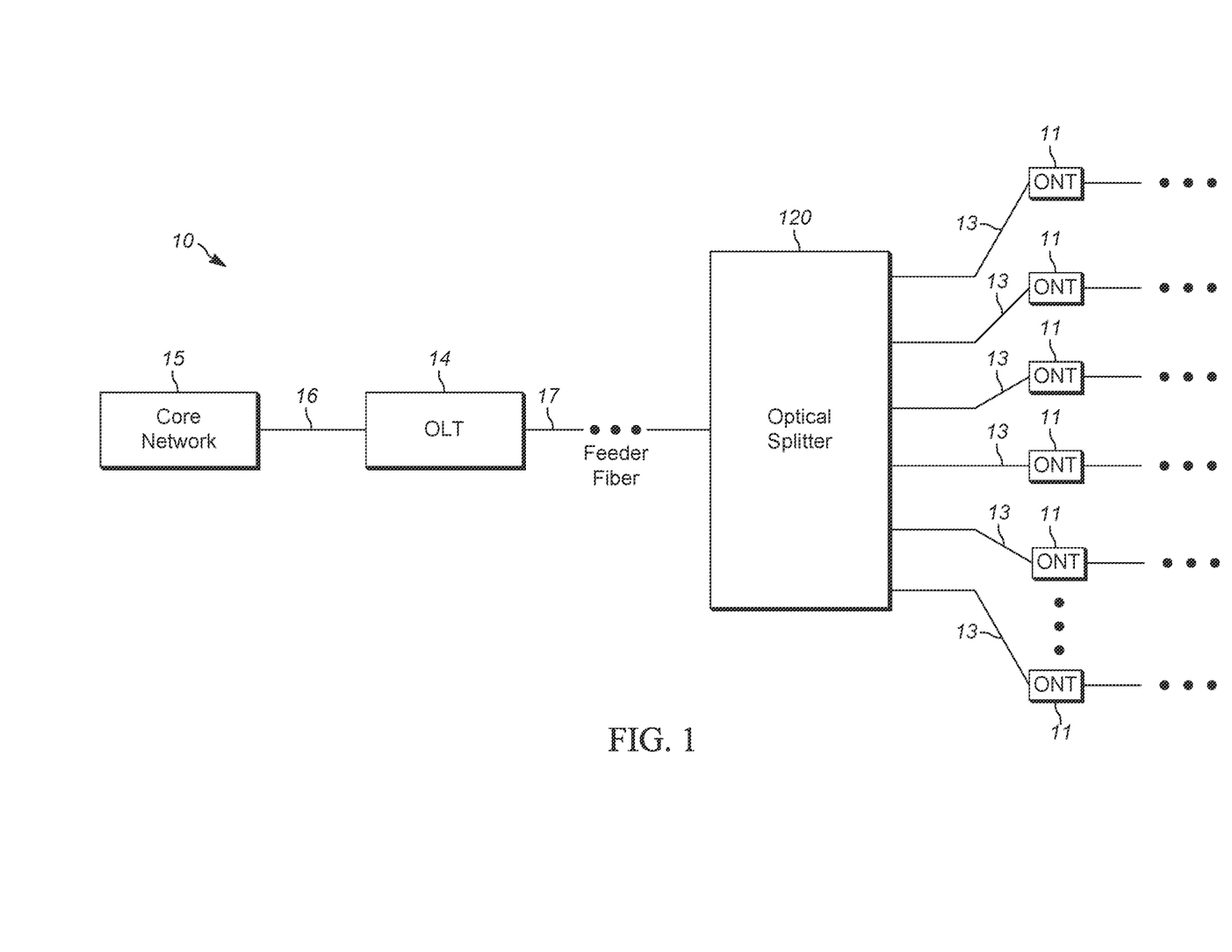
FIG. 1 illustrates a network that includes a passive optical network.

Referring to FIG. 1, in a PON 10, a set of optical fibres and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 and provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 2:
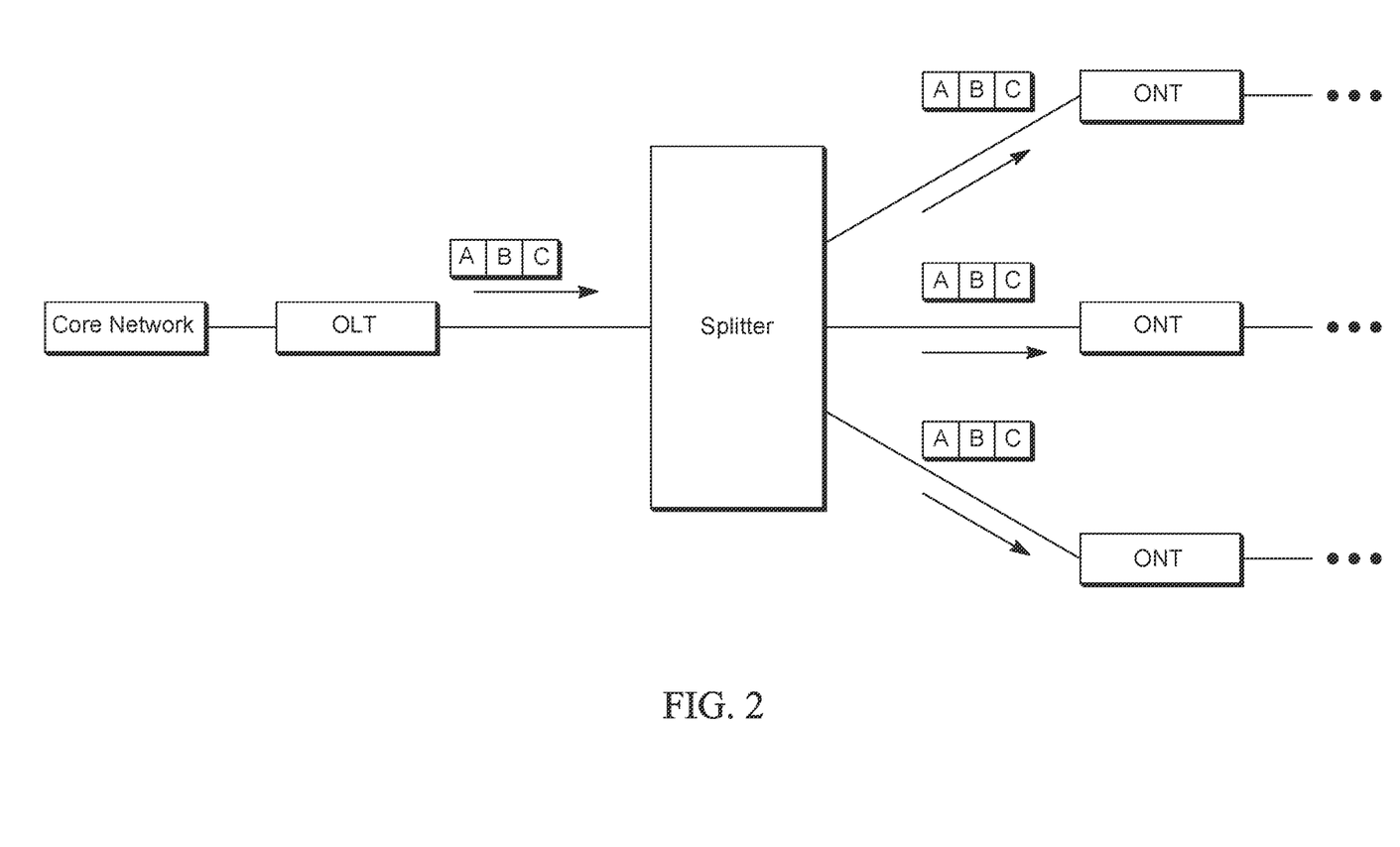
FIG. 2 illustrates a passive optical network with downstream data traffic.

Referring to FIG. 2, the PON network is based upon a point to multi-point downstream transmission arrangement. The data from the OLT is transmitted to all of the ONTs that are interconnected thereto. The data from the OLT is transmitted in the form of one or more frames, where each frame includes data for one or more of the ONTs. For example, in GPON a constant of 125 μs frame is used, where each frame includes (among other control information) an allocation map which informs on the slots granted to allocation ids. Accordingly, each frame is broken up into one or more timeslots that are designated for a corresponding selected one of the ONTs.

Figure 3:
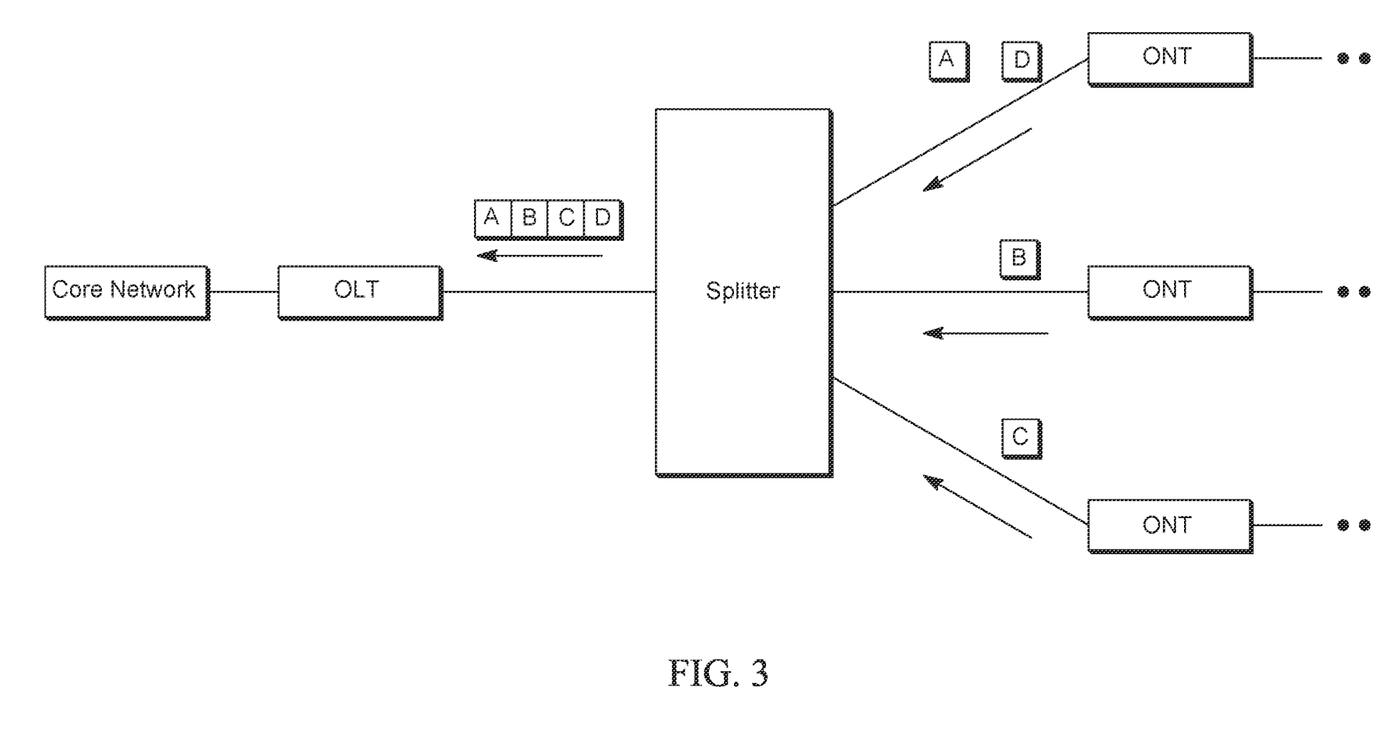
FIG. 3 illustrates a passive optical network with upstream data traffic.

Referring to FIG. 3, the PON network is based upon a multi-point to point upstream transmission arrangement using a time divisional multiple access mechanism. The OLT assigns timeslots (BWmaps) for each ONT to transmit its upstream transmission to ensure a collision free transmission. The data from each of the ONTs is transmitted to the corresponding OLT that it is interconnected thereto. The data from the ONT is transmitted in the form of a portion of one or more frames, where each frame includes data for one or more of the ONTs. For example, in GPON a reference frame of 125 μs frame is used, which is not an absolute value since a round of allocations may span through multiple upstream frames. GPON uses a Generic Encapsulation Method (GEM), which allows for the transport, segmentation and reassembly of Ethernet frames and legacy traffic (ATM or TDM). Accordingly, each frame is broken up into one or more timeslots that are designated for a corresponding selected one of the ONTs.

Figure 4:
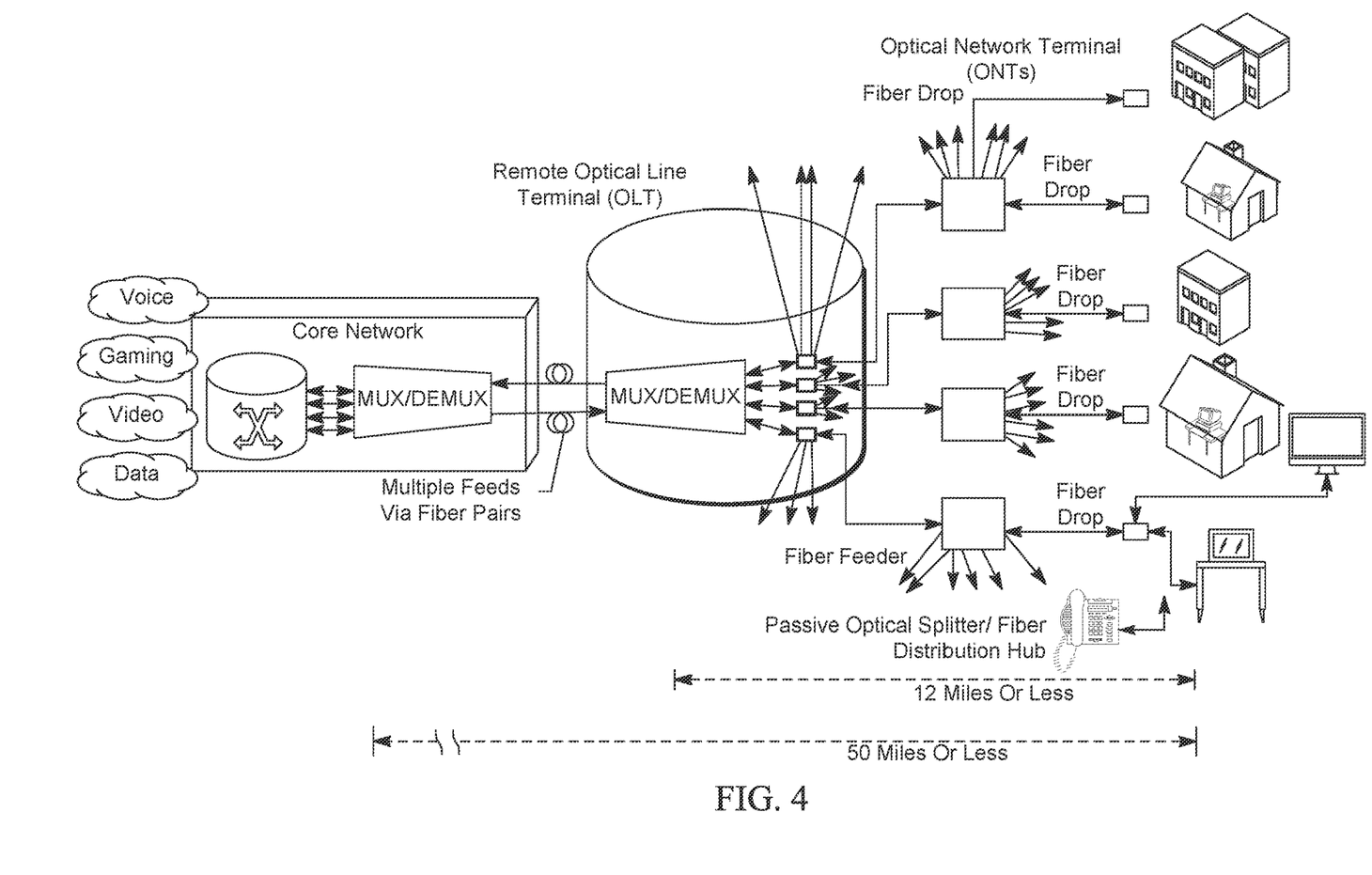
FIG. 4 illustrates a remote OLT.

Referring to FIG. 4, it is often desirable in some installations to locate the optical line terminal at a location remote from the core network, generally referred to as a remote optical line terminal (OLT). The remote OLT may include one or more feeds from the core network to the remote OLT. The remote OLT may then distribute data to a plurality of ONTs and receive data from the plurality of ONTs. Each of the ONTs in turn provides data to and receives data from customer devices. The remote OLT typically has the capability of providing services to a few hundred to a few thousand ONTs.

Figure 5:
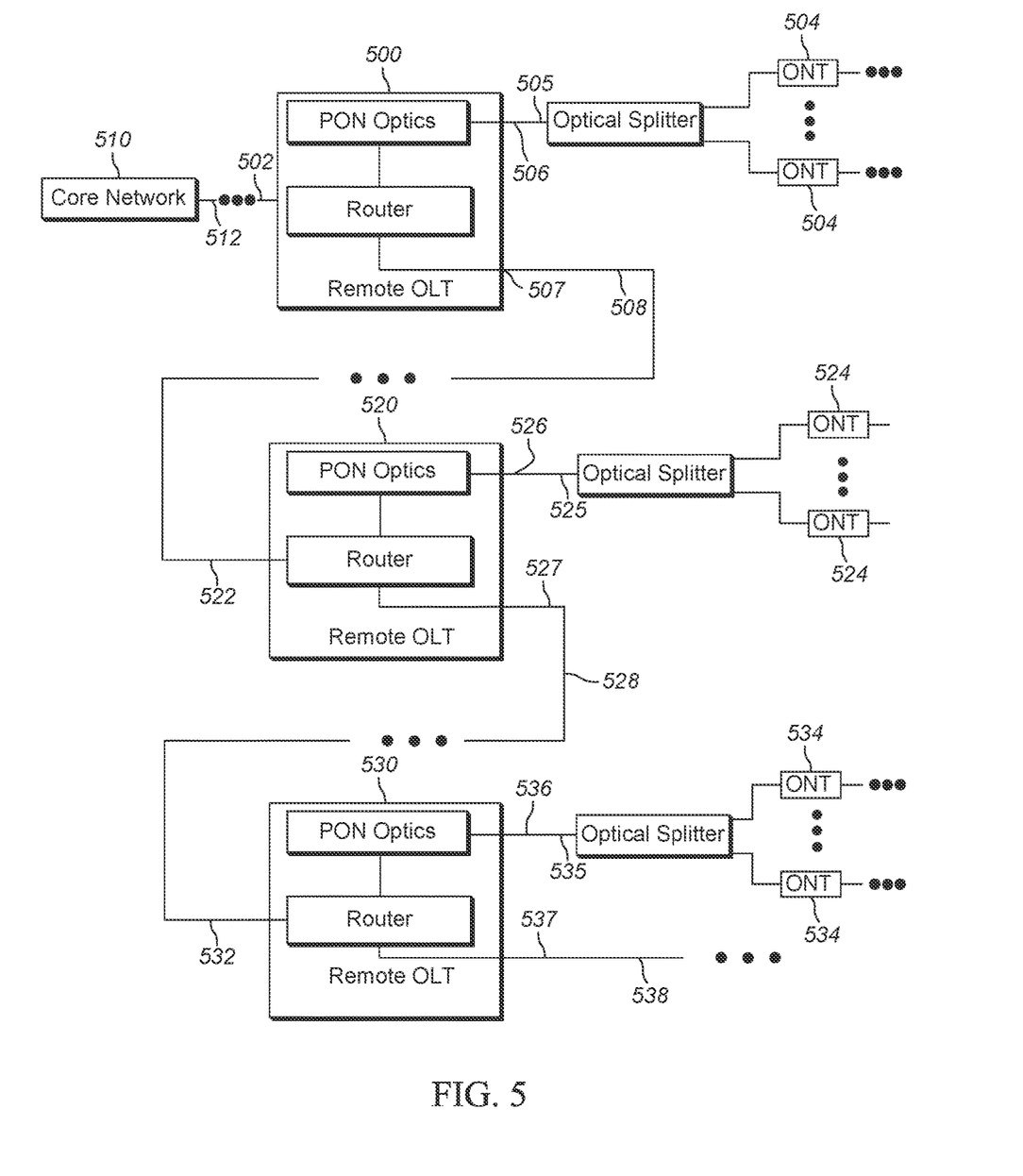
FIG. 5 illustrates daisy chained remote OLTs.

In some environments a single remote OLT may not provide sufficient quality of service for its associated ONTs and/or may not have sufficient capabilities to provide service to all of the ONTs. Referring to FIG. 5, to provide increased quality of service and/or service capabilities, it may be desirable to include a plurality of remote OLTs at a particular location or otherwise for a portion of the network, where a first remote OLT 500 receives data from the core network 510 based upon one or more feeds 512, typically using Ethernet or other packet-based networks.

The first remote OLT 500 includes a north side interface 502. The first remote OLT 500 separates out the data, preferably using an internal router, intended for ONTs 504 that the first remote OLT 500 directly provides data services to. The first remote OLT 500 includes an optical modulator (e.g., laser) and optical sensor (e.g., photodiode) to provide data services to the ONTs 504 through one or more fibers 505 at a primary south bound interface 506 using a passive optical network based protocol. The first remote OLT 500 provides the remaining data to a secondary south bound interface 507 without passing through the optical modulator and/or optical sensor which is provided to one or more feeds 508. The interconnection to the secondary south bound interface 507, typically uses Ethernet or other packet-based networks. The secondary south bound interface 507 of the first remote OLT 500 also receives data from other devices from the one or more feeds 508 and provides such data to the north bound interface 502 on the one or more feeds 512 to another device. As it may be observed the first remote OLT 500 separates the received south bound data for either using a passive optical network-based protocol or another network that is not a passive optical network-based protocol (e.g., Ethernet). As it may be observed, the first remote OLT 500 receives data from a passive optical network-based protocol on an interface and a non-passive optical network-based protocol on another interface, and provides the combined data on a non-passive network-based protocol (e.g., Ethernet) to the north bound interface.

A second remote OLT 520 includes a north side interface 522. The second remote OLT 520 separates out the data, preferably using an internal router, intended for ONTs 524 that the second remote OLT 520 directly provides data services to. The second remote OLT 520 includes an optical modulator (e.g., laser) and optical sensor (e.g., photodiode) to provide data services to the ONTs 524 through one or more fibers 525 at a primary south bound interface 526 using a passive optical network based protocol. The second remote OLT 520 provides the remaining data to a secondary south bound interface 527 without passing through the optical modulator and/or optical sensor which is provided to one or more feeds 528. The interconnection to the secondary south bound interface 527, typically uses Ethernet or other packet-based networks. The secondary south bound interface 527 of the second remote OLT 520 also receives data from other devices from the one or more feeds 528 and provides such data to the north bound interface 522 on the one or more feeds 508 to another device. As it may be observed the second remote OLT 520 separates the received south bound data for either using a passive optical network-based protocol or another network that is not a passive optical network-based protocol (e.g., Ethernet). As it may be observed, the second remote OLT 520 receives data from a passive optical network-based protocol on an interface and a non-passive optical network-based protocol on another interface, and provides the combined data on a non-passive network-based protocol (e.g., Ethernet) to the north bound interface.

A third remote OLT 530 includes a north side interface 532. The third remote OLT 530 separates out the data, preferably using an internal router, intended for ONTs 534 that the third remote OLT 530 directly provides data services to. The third remote OLT 530 includes an optical modulator (e.g., laser) and optical sensor (e.g., photodiode) to provide data services to the ONTs 534 through one or more fibers 535 at a primary south bound interface 536 using a passive optical network based protocol. The third remote OLT 530 provides the remaining data to a secondary south bound interface 537 without passing through the optical modulator and/or optical sensor which is provided to one or more feeds 538. The interconnection to the secondary south bound interface 537, typically uses Ethernet or other packet-based networks. The secondary south bound interface 537 of the third remote OLT 530 also receives data from other devices from the one or more feeds 538 and provides such data to the north bound interface 532 on the one or more feeds 528 to another device. As it may be observed the third remote OLT 530 separates the received south bound data for either using a passive optical network-based protocol or another network that is not a passive optical network-based protocol (e.g., Ethernet). As it may be observed, the third remote OLT 530 receives data from a passive optical network-based protocol on an interface and a non-passive optical network-based protocol on another interface, and provides the combined data on a non-passive network-based protocol (e.g., Ethernet) to the north bound interface.

As it may be observed, the remote OLTs may be daisy chained together with the data selectively being provided to ONTs based upon passive optical network-based protocols. The separation and combination of the data for a remote OLT between the corresponding ONTs and other devices may be performed using any suitable internal device, such as for example, an internal router. In this manner, digital data is provided to the PON optical components for sending and receiving data. In another embodiment, the separation and combination of the data for a remote OLT between the corresponding ONTs and other devices may be performed using any suitable external device, such as for example, an external router. In this case, the external router directs data to the appropriate remote OLT for sending data to respective ONTs, and to another external router that in turn directs data to the appropriate remote OLT for sending data to respective ONTs, and so forth. In this case, the remote OLT preferably only includes a single south bound interface (which may include a plurality of individual PON ports) for the associated PON devices, and preferably only includes a single north bound interface (which may include a plurality of network ports).

As it may be observed, there may exist a hierarchy of remote OLTs when such remote OLTs are daisy chained together in some manner. The Internet Protocol address and/or MAC address of each of the ONTs may be associated with a respective OLT which has its own Internet Protocol address and/or MAC address, which is preferably a range of Internet Protocol addresses and/or set of MAC addresses for the respective OLT. In this manner, for each data packet or set of data packets, the Internet Protocol address and/or MAC address may be used by a router or other device to determine whether the data should be provided to an associated remote OLT, or otherwise be provided to the next router to determine whether the data should be provided to an associated remote OLT, and so forth.

The core network, or other device, may use a discovery protocol using a broadcast data packet so that each of the respective remote OLTs may receive the broadcast data packet, and in response, provide a responsive data packet that identifies itself as a remote OLT. The responsive data packets from a plurality of remote OLTs may be used to determine the logical relationship between the respective remote OLTs, such as which remote OLT(s) are downstream from another remote OLT. In this manner, the hierarchy of the remote OLTs may be automatically determined, which reduces the likelihood of operator error if such relationships were manually configured in the core network. Further, as the network architecture is modified, the discovery protocol maybe used to rediscovery the relatively relationships between the different remote OLTs. Further, the results of the discovery protocol may be used to configure the routers within the network so the data is forwarded to the appropriate device. Other techniques may be used to determine the hierarchical relationships between the various components of the networks.

With the hierarchical relationships determined between different connections within the network, each of the remote OLTs and/or the routers, may prioritize the data traffic based upon such relationships. By way of example, a remote OLT may prioritize data traffic from its respective ONTs over data traffic from other remote OLT(s). By way of example, a remote OLT may prioritize data traffic from other remote ONT(s) over data traffic from its respective ONTs. By way of example, a router may prioritize data traffic from a corresponding OLT and its respective ONTs over data traffic from other remote routers and/or remote OLT(s). By way of example, a router may prioritize data traffic from other remote routers and/or remote OLT(s) over data traffic from its corresponding OLT and its respective ONTs. In this manner, the prioritization of data traffic may be based upon the relationship between the hierarchical architecture of the remote OLT(s) and/or routers. Also, in this manner particular data traffic may be prioritized over other data traffic (e.g., transmitted first, transmitter earlier, not dropped, dropped, or otherwise). Also, in this manner particular data traffic may be dropped and/or prioritized based upon the prioritization when there is network congestion.

By way of example, there may be queues of data within the remote OLTs and/or routers, where data is queued prior to be being transmitted to the next device within the network. The data may be tagged with priority tags, such as low priority, medium priority, and high priority. If data is dropped from within any particular queue, then preferably the low priority data is dropped prior to the medium and high priority data, and the medium priority data is dropped prior to the high priority data. Also, the data in any particular queue may be reordered based upon the priority tag. For example, data with high priority tags may be re-ordered to be transmitted prior to data with medium and low priority tags, and data with medium priority tags may be re-ordered to be transmitted prior to data with low priority tags. By way of example, the traffic in some passive optical networks may be prioritized based upon P bits.

By way of example, there may be queues of data within the remote OLTs and/or routers, where data is queued prior to be being transmitted to the next device within the network. The data may be prioritized based upon the service level agreement of the customer associated with the data, such as low, medium or high, or 0-7 with 7 being high and 0 being low. If data is dropped from within any particular queue, device, or otherwise, then preferably the low SLA data is dropped prior to the medium and high SLA data, and the medium SLA data is dropped prior to the high SLA data, with the same occurring based upon the 0-7 service level agreements.

Figure 6:
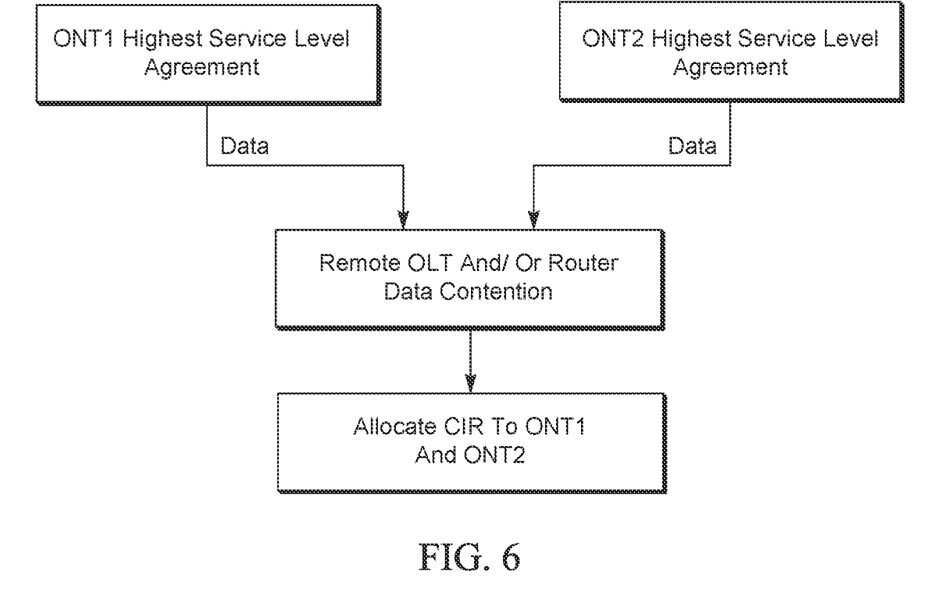
FIG. 6 illustrates committed information rate for ONTs.

Referring to FIG. 6, after further consideration it was determined a technique should be implemented that provides for a manner of determining how to manage data traffic when data from different devices, such as different ONTs, should be prioritized in the case of contention when they both have the same highest service level agreement. In such a case for a limited time duration and/or a non-limited time duration, the system may allocate a committed information rate (CIR) to each of the different ONTs with the highest service level agreement, and especially those that recently experienced data contention. The committed information rate defines the guaranteed bandwidth provided by the network when delivering the data frames from the respective ONTs. The incorporation of a committed information rate for selected ONTs may result in unused bandwidth because the bandwidth associated with the committed information rate is not usable by other ONTs, but otherwise provides a desirable data prioritization for the selected ONTs based upon their highest service level agreements. The remaining bandwidth available after excluding the bandwidth associated with the committed information rate based ONTs is then allocated among the remaining ONTs. When it is determined that data contention has subsided or otherwise does not occur with regularity, the system may remove the committed information rate for the selected ONTs.

Figure 7:
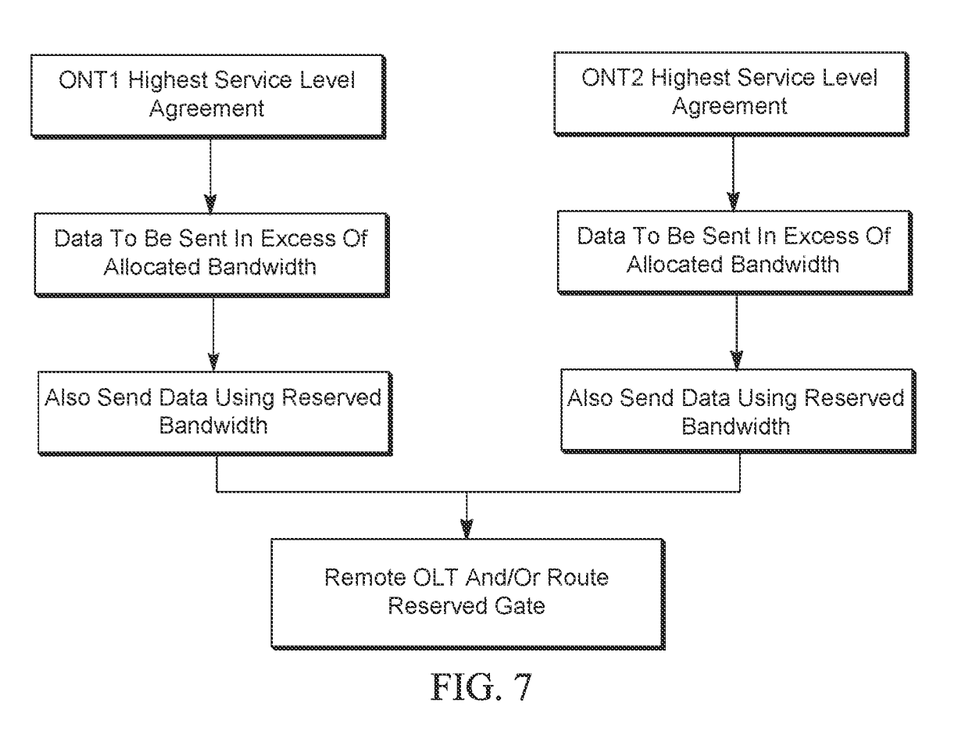
FIG. 7 illustrates usage of reserved bandwidth for ONTs.

Referring to FIG. 7, another technique that provides for a manner of determining how to manage data traffic when data from different devices, such as different ONTs, should be prioritized when they both have the same highest service level agreement includes reserving an additional portion of the bandwidth, such as 10% of the bandwidth, for those ONTs which have the highest service level agreements in case a data collision would otherwise occur and not making this additional portion of the bandwidth available to other ONTs with a lower service level agreement even if a data collision occurs among those with the lower service level agreements. For example, a first ONT with the highest service level agreement may use a first selected portion of the bandwidth, which is always allocated to them in addition to their normal allocation. For example, a second ONT with the highest service level agreement may use a second selected portion of the bandwidth, which is always allocated to them in addition to their normal allocation. In the event of a potential collision for those ONTs having the highest service level agreements, all or a portion of the additional portion of the reserved bandwidth may be used by those ONTs which is in addition to their normal allocation of bandwidth. In the event of one or more ONTs having the highest service level agreements, all or a portion of the additional portion of the reserved bandwidth may be used by those ONTs which is in addition to their normal allocation of bandwidth. The reserved bandwidth may be modified, depending on conditions of the network.

Another technique that provides for a manner of determining how to manage data traffic when data from different devices, such as different ONTs, should be prioritized when they both have the same highest service level agreement includes synchronizing the frames among the different ONTs with the same highest service level agreement. For multiple different such ONTs being provided with data services from the same remote OLT, then a different allocated time slot is provided for each of the different ONTs. For multiple different such ONTs being provided with data services from the different remote OLTs, then a different allocated time slot is provided for each of the different ONTs with respect to the other allotted time slots for such ONTs. The different allocated time slots among the different OLTs may be adjusted to account for the differences in the transmission times among the different OLTs so that at each device where data from two such different allocated time slots remain non-overlapping. Therefore, from a temporal viewpoint the sub-frames of a frame for the different ONTs with the same highest service level agreement will be aligned in a non-overlapping manner among the different OLTs, including accounting for data travel times, timing for transmission from any queues, time to pass through one or more interconnections, and other temporal adjustments. In this manner, the bandwidth allocation for such different OLTs may rely on a centralized allocation of bandwidth that takes into account the hierarchical structure of the remote OLTs in the network.

In an additional embodiment, one or more queues within the network may include a separate queue for the highest service level agreement, such as service level 7. The queue with data corresponding to ONTs with the highest service level agreement may be removed and transmitted from the queue at a rate more frequent than the other queues not corresponding to the highest service level agreement.

As previously described, when there is multiple highest service level agreement ONTs there is preferably coordination between what occurs on the passive optical network-based devices (e.g., PON based data traffic) and what occurs on the non-passive optical network-based device (e.g., packet-based Ethernet data traffic), that may result in reducing data contentions.

If desired, the core network (or otherwise) may include a collaborative dynamic bandwidth allocation technique that allocates bandwidth among a plurality of remote OLTs in order to increase the overall efficiency of the data transmission. The collaborative dynamic bandwidth allocation technique may further take into account the hierarchical nature of the remote OLTs, the timing between different OLTs and/or routers, transmission times, etc.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An access network comprising:
   (a) a first optical line terminal capable of receiving digital data and in response providing first transmitted optical digital data to a first plurality of optical network terminals, said first optical line terminal capable of receiving first received optical digital data from said first plurality of optical network terminals and in response providing digital data;
   (b) a first routing device associated with said first optical line terminal that receives first digital data and provides a first portion of said first digital data of said received digital data of said first optical line terminal that is provided as said first transmitted optical digital data, and provides a second portion of said of said first digital data to a second routing device;

(c) a second optical line terminal capable of receiving digital data and in response providing second transmitted optical digital data to a second plurality of optical network terminals, said second optical line terminal capable of receiving second received optical digital data from said second plurality of optical network terminals and in response providing digital data;

(d) said second routing device associated with said second optical line terminal that receives said second portion of said of said first digital data as second digital data and provides a first portion of said second digital data of said received digital data of said second optical line terminal that is provided as said second transmitted optical digital data, and provides a second portion of said of said second digital data to another device.

2. The access network of claim 1 further comprising each of said first plurality of optical network terminals capable of receiving said first optical digital data from said first optical line terminal from an optical fiber connection and provide optical digital data to said optical fiber connection to said first optical line terminal.

3. The access network of claim 2 further comprising each of said second plurality of optical network terminals capable of receiving said second optical digital data from said second optical line terminal from an optical fiber connection and provide optical digital data to said optical fiber connection to said second optical line terminal.

4. The access network of claim 1 wherein at least one of said first routing device and said first optical line terminal prioritizes data packets based upon a hierarchical relationship of said first optical line terminal and said second optical line terminal.

5. The access network of claim 1 wherein said first routing device prioritizes data packets between said first optical line terminal and said second optical line terminal.

6. The access network of claim 1 wherein at least one of said first routing device and said first optical line terminal prioritizes data packets based upon a service level agreement associated with each of said data packets.

7. The access network of claim 1 wherein at least one of said first routing device and said first optical line terminal prioritizes data packets based upon a highest service level agreement associated with each of said data packets.

8. The access network of claim 7 wherein said prioritization is based upon a committed information rate of said data packets having an associated said highest service level agreement.

9. The access network of claim 7 wherein said prioritization is based upon a reserved portion of bandwidth for said data packets having an associated said highest service level agreement.

10. The access network of claim 1 wherein (1) at least one of said first routing device and said first optical line terminal and (2) at least one of said second routing device and said second optical line terminal, prioritizes data packets based upon a highest service level agreement associated with each of said data packets from (1) at least one of said first plurality of optical network devices and (2) at least one of said second plurality of optical network devices, with the data packets being temporally synchronized with respect to one another in a non-overlapping manner.

* * * * *